Oct. 17, 1939.  A. O. BRUESTLE  2,176,486
MACHINE FOR MANUFACTURING CUTTER BITS
Filed May 25, 1936  5 Sheets-Sheet 1

INVENTOR.
BY Armin O. Bruestle
Wood & Wood
ATTORNEYS

Oct. 17, 1939.  A. O. BRUESTLE  2,176,486
MACHINE FOR MANUFACTURING CUTTER BITS
Filed May 25, 1936   5 Sheets-Sheet 2

INVENTOR.
Armin O. Bruestle
BY
Wood & Wood
ATTORNEYS

Fig. 14

Patented Oct. 17, 1939

2,176,486

UNITED STATES PATENT OFFICE 2,176,486

MACHINE FOR MANUFACTURING CUTTER BITS

Armin O. Bruestle, Cincinnati, Ohio, assignor to The Cincinnati Mine Machinery Company, Cincinnati, Ohio, a corporation of Ohio Application May 25, 1936, Serial No. 81,664

18 Claims. (Cl. 51—98)

This invention relates to the art of manufacturing replaceable bits for use in cutter chains of the type employed in mining machines, and is particularly directed to a machine for and method of cutting these bits from lengths of bar stock. The cutter bits, the manufacture of which is concerned in the present invention, are of the class providing cutting points by virtue of obliquely cut end faces, and may be of the type disclosed in the patent issued to Edwin P. Stenger and Armin O. Bruestle, No. 2,039,747, May 5, 1936.

It is the primary object of the present invention to lessen the cost of production of coal cutter bits by the provision of a machine which operates to manufacture the bits at a high rate of speed, and which can be operated by relatively unskilled labor. To this end the invention resides in a machine which completely eliminates the necessity for forging, heat treating, and resharpening equipment at the mine.

It is a further object of the present invention to provide a machine for this purpose which will receive bar stock and make successive oblique severances thereof for the complete manufacture of a cutter bit in one operation; which machine incorporates an improved cut-off unit embodying a thin abrasive disc or wheel which can be passed through the work without destructive deflection of the disc, whereby the life of the discs or wheels is greatly lengthened and breakage loss is decreased; which embodies a range determining device, whereby the operator can limit or control the movements of the cutter unit or arm depending on the diameter of the cutter disc; which embodies a speed control device in combination with the range determiner, increasing the speed of rotation of the cutter disc as its diameter decreases by an intercontrol mechanism directed to the power source for the purpose of maintaining constant peripheral speed of the cut-off disc; which embodies a fixture for holding the bar stock during cutting including operating means in releasing the work and ejecting the cut-off portion of the bit through means coordinated or interconnected with the fixture; which embodies a novel cooling system and method for constantly directing a supply of coolant to the region of the cut-off operation; and which embodies an apparatus incorporated in the cut-off unit for properly balancing the cut-off unit as it is moved toward and from the work, lessening the pressure required to operate the same, this apparatus being automatically adjusted as the range of movement of the disc toward and from the work is adjusted.

By means of the foregoing improvements, the speed of the cut-off operation is increased, it being unnecessary for the operator to move the cutter disc an unnecessary distance. It is further accomplished that uniformity of peripheral speed of the cutter disc is maintained and its efficiency will continue until its diameter is reduced to the point where it is not longer possible to use the same.

It is a further object of the present invention to provide a method of severing elements from bar stock having surfaces receding from the point of initial cutting contact or of flat sided configuration such as stock of diamond cross section, wherein a thin abrasive cutter disc may be employed without breakage. It will be realized that as oblique cuts are made through bar stock there is a tendency to deflect the cutter disc down one or the other flat surfaces of the bar stock and for this reason the line of approach of the rotating cutter disc and its line of movement through the bar stock as brought about by the relation of its center and the fulcrum point of the arm, which carries the same, to the work is of considerable importance. The present invention provides an arrangement of these parts which reduces the deflection to a minimum and greatly lengthens the life of the cutter discs by reduction of breakage.

It is a still further object of the present invention to provide a method of and apparatus for constantly directing a supply of coolant to the region of the cut-off operation, wherein the application of the coolant to the abrasive cut-off disc and the work is highly effective for increasing the efficiency of the cut-off operation.

Broadly speaking, the present concept of method and apparatus has made it possible to sever bar stock of the character mentioned at a high rate of speed for the production of bits from bar stock to condition ready for use through the medium of a single machine.

Other objects and further advantages will be more fully apparent from a description of the accompanying drawings, in which:

Figure 14 is a diagrammatic view illustrating the relation of the centers of the arm pivot and the cut-off disc relative to the work.

The machine in general comprises a base 20, a pivoted manually controlled cutter arm 21, and a treadle operated, work clamping fixture 22. The cutter arm rocks freely on trunnion bearings 23, 23, which form a fulcrum point near the center of gravity approximately balancing the arm. The work clamping fixture 22 is mounted on a table 24 directly beneath the outer end of the cutter head. Its purpose is to clamp the bar stock rigidly in place for the cutting operation performed by an abrasive disc 25.

The bar stock is fed into a channel 26 in the top surface of the block 27 of the fixture. It is engaged by clamping fingers 28, 28, which project slightly beyond the center of the channel to insure contact with the upper longitudinal edge of the diamond shaped bar stock. Each finger is pivoted in a bracket 29 by means of a pin 30, and receives its thrust from a compression spring 31 located adjacent the particular bracket in a recess 32 in the block 27 of the fixture. The upper ends of each spring engage over a lug 33 formed on the outwardly projecting lever portion of the particular finger.

The lever portions of the fingers 28, 28, project horizontally, slightly beyond the sides of the table where they are pivotally connected to a horizontal bar 34 by means of links 35, 35. The horizontal bar 34 is connected to the treadle 36 by means of a vertical link 37 by welding or other means, the lower end being pivoted on the treadle lever 36.

The treadle 36 has its inner end pivoted on a pin 38, (see Fig. 2) mounted in lugs 39, 39, integral with the base. A tension spring 40 connected between the base and a point midway of the length of the treadle 36 counter balances the weight of the assembly. An adjustable stop is provided in the form of a screw 41, which is threaded into a lug 42. This screw limits the movement of the treadle. The stop is locked in adjustment by means of a lock nut 43.

Figure 10:
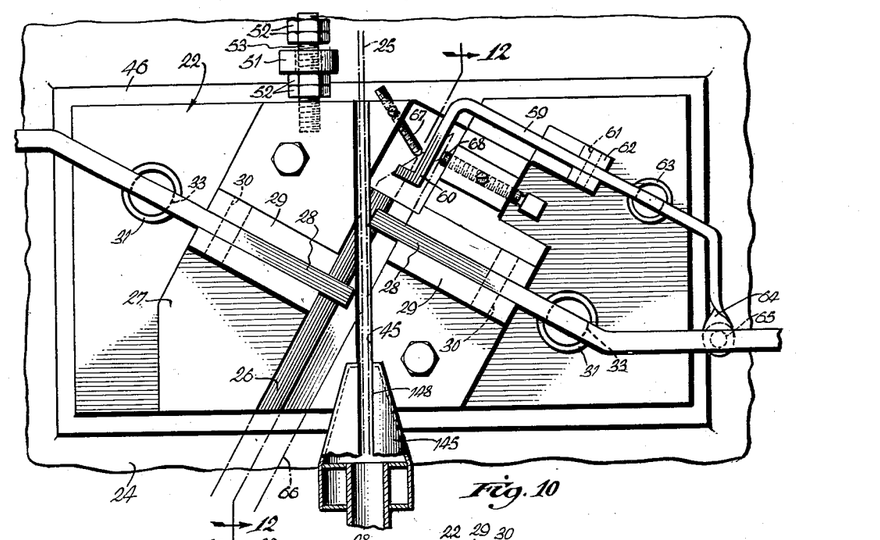
Figure 10 is a top plan view of the work clamping fixture.
Figure 11:
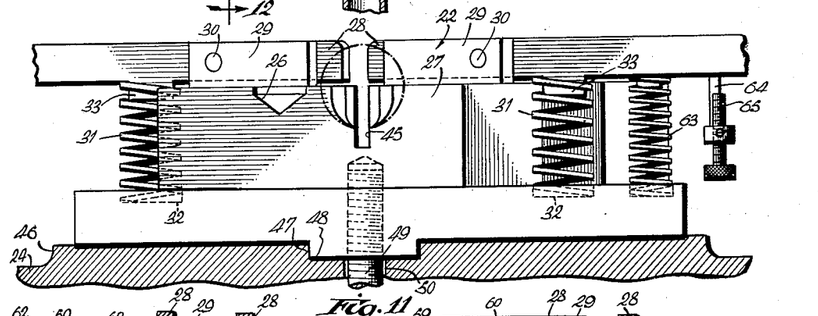
Figure 11 is a front elevation of the fixture.

The abrasive cut-off disc 25 is located on the arm and is normally poised above the work fixture due to the weight of the motor. A light pull on the manual control lever 44 is sufficient to tilt the unit and lower the cut-off head. The disc in descending passes through or traverses the channel 26, obliquely thereto, and is received in a slot 45 aligned with the disc. The slot 45 is provided to accommodate the disc when making a cut, and the channel is arranged at an angle to the slot to give the proper angle to the cut, which forms the end face of the bit (see Figure 10).

In practice it has been found necessary to present the cut-off disc to the bar edge for a balanced cut, otherwise breakage of the disc results. This is caused by lateral deflection of the disc due to the angular relation between the disc and the bar in conjunction with the diamond shaped cross section of the bar.

In the present method the disc is presented to the work so that a line, which is tangential to the periphery of the disc at the point of contact with the bar stock, is substantially parallel to the major axis of the cross section of the bar stock. In other words, the line of travel followed by the center of the disc, while making the cut, is substantially parallel to an axis of the bar stock being cut and at every stage in the cutting operation, that portion of the bar stock which has been cut is substantially symmetrical about the aforesaid axis.

Otherwise expressed, the bar stock concerned in the present problem presents surfaces sloping downwardly at either side of the longitudinal edge portion of the stock. When the cutter disc engages the longitudinal edge in accordance with the present invention, a tangential line of the disc taken through the point of contact with the longitudinal edge of the stock forms equal angles with the sloping surfaces of the stock.

As illustrated diagrammatically in Figure 14, the parts are arranged so that deflection of the cut-off disc as it comes in contact with the work is reduced to a minimum. For the purpose of illustrating the arrangement, the cut-off disc is indicated at three different sizes or diameters, namely A, B and C. A indicates the diameter of the disc when it is placed in service; B the intermediate diameter after a period of use; and C the diameter when the disc is to be discarded. In this diagram, D indicates the pivot of the fulcrum for the arm carrying the cut-off disc. The plane of the horizontal or major axis of the bar stock has been extended as at E for the purpose of illustrating the arrangement hereinafter set forth. The fulcrum point D of the arm is located above the plane E.

When the disc has worn to the intermediate diameter B, the center of the disc, indicated at F, is in the same horizontal plane, indicated at G, with the fulcrum D of the arm, that is to say, in a plane parallel with the major axis of the work. This relationship is described with the cut-off disc initially contacting the work. At this point it will be noted that the center F of the disc is also aligned with the minor axis of the work, bringing about the result that the cut is balanced. For this reason, as has been described, a line H which is tangential to the periphery of the disc at the point of contact with the work is parallel with the major axis E of the work. Due to the fact that the fulcrum of the arm is set back a considerable distance, the arc of swing of the center of the disc is relatively flat and there is very little deviation from coincidence with the minor axis of the work as the cut progresses. Accordingly, the cut may be described as symmetrical with respect to the minor axis at all stages.

In the event, for example, that a disc of greater diameter than that placed in the machine as heretofore described is utilized, the machine provides means for adjusting the fixture in relation to the cut-off disc. The adjustment means for the fixture is as follows:

A raised portion 46 of the table 24 on which the fixture rests has a slot 47 for receiving a key portion 48 of the base plate of the fixture. A bolt 49 is threaded into the fixture (see Fig. 4) and passes through a second slot 50. The head of the bolt has engagement with the underside of the table for holding the fixture in position. A lug 51 projects upwardly from the table and limits movement of the fixture. For this purpose spaced lock nuts 52 are provided on stud 53, which is screwed into the fixture and traverses the lug 51.

As illustrated in Figure 14, the center I of the large disc has some lateral movement due to its position higher up on the arc of travel. As is illustrated, a line projected downwardly from the center I perpendicularly to the plane of the work table is indicated at J, while passing through the minor axis of the work when the disc is first placed in service will not do so after the center has moved down on the arc to the point of center F. At this point the operator adjusts the fixture to shift the work so that coincidence of the center with the minor axis of the work is again brought about and detrimental deflection is prevented.

Figure 1:
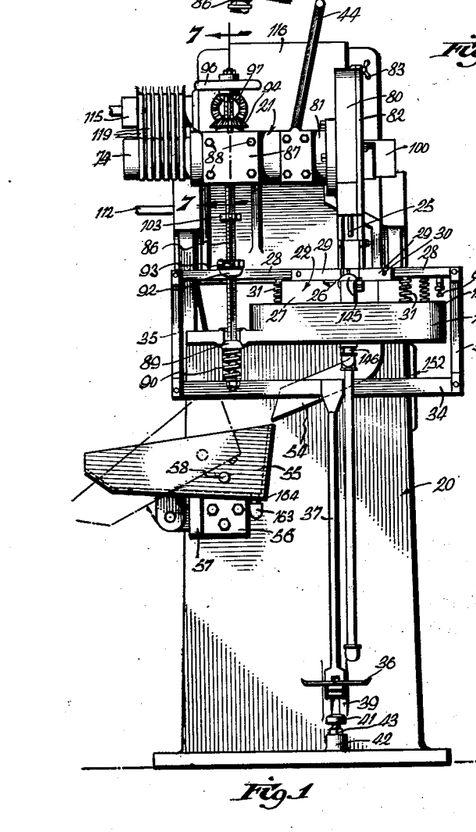
Figure 1 is a front elevation of the bit forming machine.

The bit channel 26 in the table terminates at a discharge opening including a chute 54 which conducts the finished bits to a hopper 55. The hopper 55 is pivoted at a bracket 56 (see Fig. 1) bolted to the front of the machine. The bracket 56 has a stationary lug 57 for maintaining the hopper in upright position. A handle 58 is provided on the side of the hopper for conveniently tilting it to discharge its contents when necessary.

After a cut has been made, the lever 44 is released and the head swings back to its original position by gravity. The treadle 36 is then depressed causing the fingers 28, 28, to lift and the finished bit to be ejected.

The ejector consists of a lever 59, having a finger 60 at right angles, in contact with the outer end of the bit. The lever 59 is pivoted on a pin 61 between lugs 62, 62, and is actuated by means of a spring 63. An extension 64 is formed by twisting the lever end beyond the edge of the fixture, this extension 64 carrying a set-screw 65 cooperating with a finger 28. As the fingers are lifted the ejector acts in the opposite direction due to the action of the spring 63 as permitted by the clearance between the set-screw 65 and the finger 28.

Figure 12:
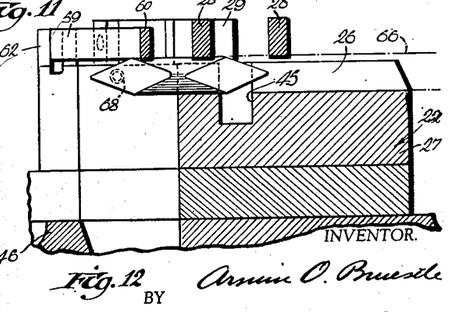
Figure 12 is a sectional view taken on line 12—12, Figure 10, illustrating a formed bit in place before being ejected.
Figure 13:
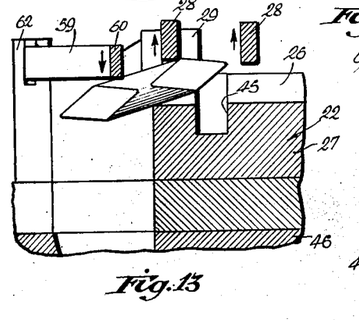
Figure 13 is a view taken similar to Figure 12, but showing the ejection of the bit by the clamping fixture.

As shown in Figures 12 and 13, the finished bit is positioned in the channel 26 over the chute 54. In Figure 12 both members are exerting a downward thrust on the bit. However, the compression of the spring 31 acting on the finger 28 is considerably greater than that of the spring 63 acting on the ejector 59 and as a consequence the ejector has no influence on the bit. As the finger 28 is raised against the compression of the spring 31, however, the ejector forces the outer end of the bit downwardly (see Fig. 13) as the force of the spring 63 is still acting on the ejector. The clearance between the set-screw 65 and the finger 28 is sufficient to allow the bit to become completely dislodged.

At this point, further downward movement of finger 28 starts the ejector on its upward movement by means of contact of the finger 28 with the set-screw 65, until the lower limit of treadle movement is reached, at which point both the fingers 28, 28, and the ejector 59 are sufficiently raised, permitting the operator to turn the bar 180 degrees and advance the same to repeat the cycle.

The bar stock 66, fed forwardly, engages against a pair of adjustable stop-screws 67 and 68 located above the passageway to the chute. The stop-screw 67 engages against the oblique cut face of the bar and the stop-screw 68 against the side. The screw 68 is adjustable for the purpose of preventing canting or lateral displacement of the stock in the channel as the oblique end face is engaged against the stop-screw 67. The screw is set in accordance with the width of the stock. Since the bar has been turned over, the end engaging the stop-screws is disposed opposite to the angle at which the wheel cuts. The treadle is now released, the fixture thereupon clamping the bar firmly in place. The cutter head is then brought down to cut off the end of the bar stock to form a bit.

Figures 2, 6:
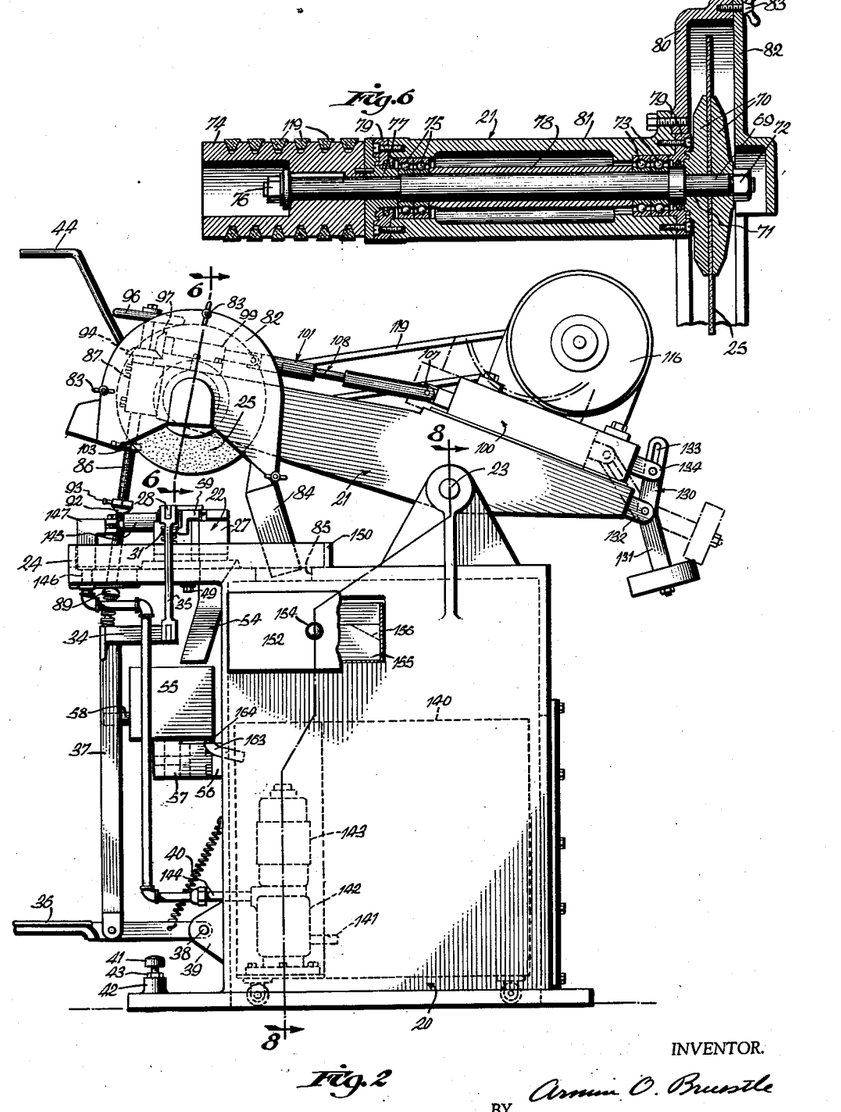
Figure 2 is a side elevation of the machine.
Figure 6 is a sectional view taken on line 6—6, Figure 2, illustrating the spindle assembly for the cut-off disc.
Figure 3:
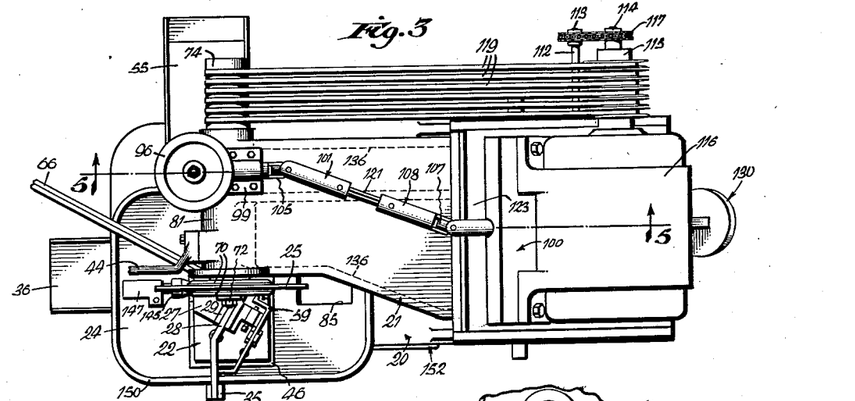
Figure 3 is a top plan view of the machine with the guard for the cut-off disc removed for illustrating certain parts on the work table.

The cut-off wheel 25 is journalled in the outer extremity of the arm 21 and is mounted on a shaft 69 between hub plates 70, 70, and drawn tightly against a shoulder 71 by means of a nut 72. The shoulder 71 is held against the inner races of a pair of ball bearings 73 which support the shaft 69 in the housing at this point. The outer races of the bearings are carried in a reduced portion of the bore of the housing.

A multiple V belt pulley 74 is keyed to the opposite end portion of the shaft and drawn tightly against the inner races of a pair of ball bearings 75 by means of a nut 76 through the medium of a thrust element 77 pinned to the pulley to act as an oil seal. The bearings are mounted in the same manner as those on the opposite end, the outer races being fitted in a reduced bore of the housing in a similar manner. The inner races of the ball bearings 73, 75, are spaced by a sleeve 78. The nut acting on the pulley 74 and thrust element 77 maintains the assembly. End plates 79, 79, are provided on the opposite ends of the housing, each having an oil seal and a packing ring to prevent oil leakage.

The cut-off disc is encased in a guard 80 bolted to a flange integral with the housing 81. A removable cover plate 82 held in place by wing nuts 83 closes the open side of the guard and facilitates the replacement of worn out discs. The guard is approximately semicircular and has a depending deflection element or channel 84 at the rear cooperating with an opening 85 in the table.

In an operation of this class, where metal bars of considerable thickness are to be cut, it has been found that for greatest efficiency, the wheel must rotate at sufficient velocity to produce a peripheral speed of about 16,000 feet per minute. At this speed the wheels have their greatest efficiency. As the diameter reduces, the R. P. M. must be increased to maintain the peripheral speed; otherwise, as wear takes place, the peripheral speed will decrease. An automatic range and speed determiner is employed to eliminate unnecessary arm movement and to insure maintenance of proper speed at the wheel periphery for efficient cutting.

The speed and range determiner consists of a screw-threaded shaft 86 threaded through a block 87 fixed to the outer face of the arm by screws 88. The shaft passes through an open slot of the table and has a stop element 89 thereon for limiting upward movement of the arm. The stop is cushioned by a spring 90 compressed between a nut and washer at the lower end and the stop element or button 89 which bears against the lower side of the slot when the arm is allowed to rise. The button is limited in upward movement by engagement with a shoulder 91 formed by a counterturned portion of the shaft.

The length of stroke or range of the cutter head is determined by the distance between the lower stop button 89 and an upper stop button 92 which is adjustable for limiting downward movement to a predetermined point sufficient to allow the disc to cut completely through the bar. The button 92 is screwed on the shaft for purposes of adjustment and is locked in place by a set-screw 93 engaging in a keyway running the length of the shaft.

Figure 7:
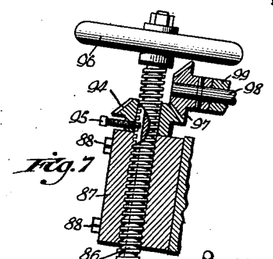
Figure 7 is a fragmentary sectional view taken on line 7—7, Figure 1, illustrating the driving elements and control mechanism on the upper end of the speed and range determiner.
Figure 8:
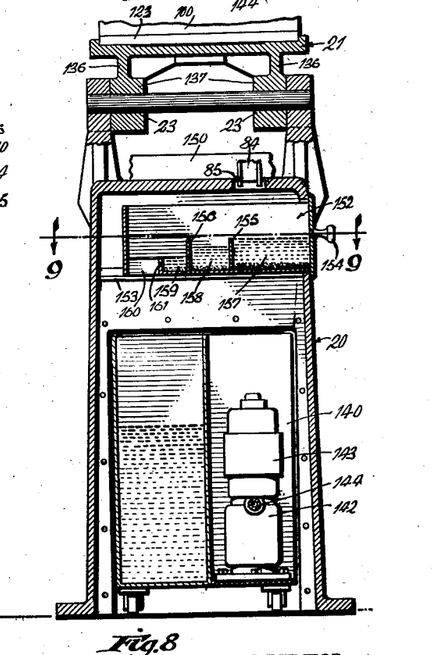
Figure 8 is a longitudinal sectional view taken through the machine base on line 8—8, Figure 2.
Figure 9:
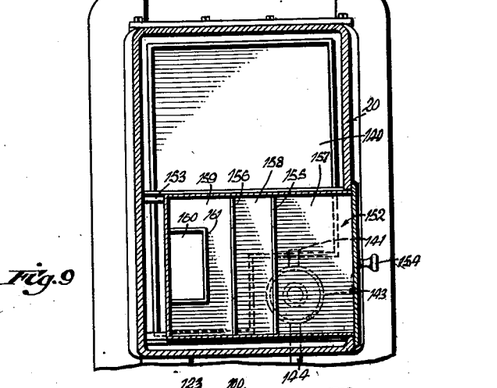
Figure 9 is a horizontal sectional view of the base, taken on line 9—9, Figure 8.

The upper end of the shaft projects above the block and carries a bevel gear 94 keyed to the shaft by means of a screw 95 forming a spline key engaging the spline of the shaft. A hand wheel 96 is fixed to the end of the shaft above the bevel gear. A second bevel gear 97 pinned to a shaft 98 meshes with the first mentioned gear.

The shaft 98 is journalled in a bearing bracket 99 fastened to the top surface of the arm by screws and connects with the motor base 100 through a flexible operating shaft 101. The driving means includes a speed changing device which may be either mechanical or electrical, a commercial type variable speed control 102 being disclosed in the drawings.

The range determiner operates as follows: The cutting disc is brought down in contact with and through the bar and is stopped slightly beyond the lower edge of the bar by the upper stop button 92 which comes in contact with the table. As wear diminishes the diameter of the disc, the cut through the bar would be incomplete. An adjustment is then made to allow the head to come down lower.

The adjustment is made by turning the hand wheel 96 and shaft 86, causing the arm to move downwardly a distance sufficient to allow the cut-off disc to pass through the work. The bevel gear 94, being keyed to the shaft 86, turns the bevel gear 97 and shafts 98 and 101 a proportionate amount and thus changes the speed of the motor an amount proportionate to the decrease in size to bring the disc up to speed. This adjustment does not change the length of stroke of the cutter head, as the relationship of the stops 89 and 92 to each other is the same, the change taking place in the relation of the cutter head to the stops.

As wear of the disc progresses a point is reached where it should be replaced. To insure this being done at the proper time, a stop nut 103 is provided which prevents further adjustment when the block 87 contacts the nut. The stop nut 103 is secured to the shaft by a set-screw 104.

Figures 4, 5:
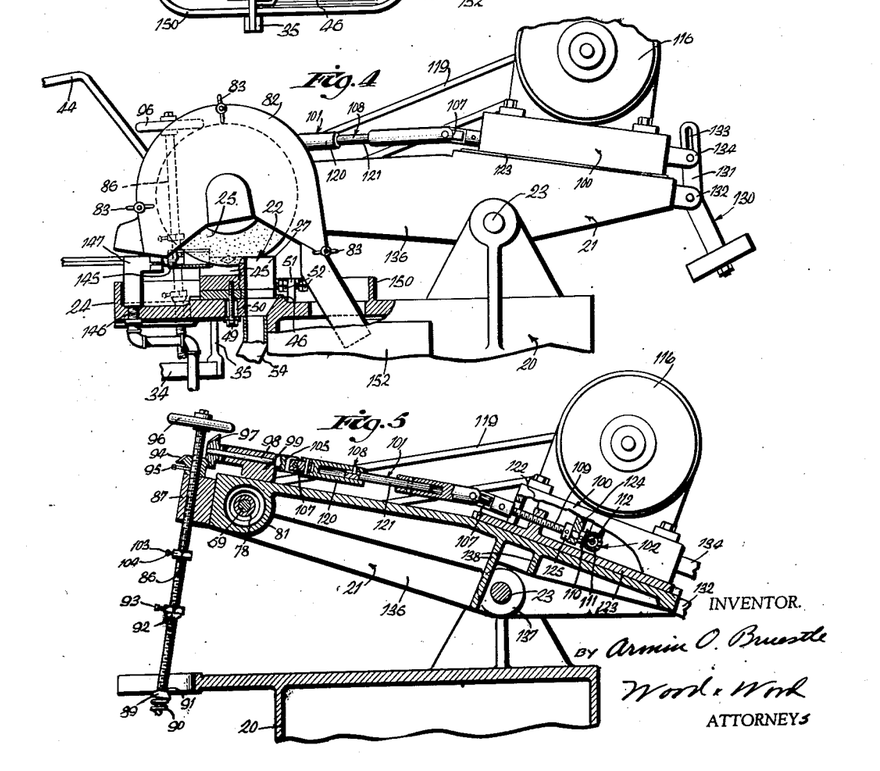
Figure 4 is a fragmentary side elevation of the machine, partly in section, showing the cutter head in position at the time of severance of a bit.
Figure 5 is a fragmentary sectional view taken on line 5—5, Figure 3, illustrating the speed and range determiner.

As shown in Figure 5, the speed change is accomplished through the medium of the operating shaft 101, in connection with the motor base 100, interlocking the range determiner with the speed adjustment of the motor. The operating shaft 101, for purposes hereinafter disclosed, consists of a stub shaft 105 pinned to shaft 98 journalled in the bearing bracket 99 on the arm. The opposite end of the shaft is connected to the motor base 100. Since the motor base is out of alignment with the bracket, universal joints 107, 107, are interposed in the shaft. A sliding coupling 108, between the two universal joints, allows relative movement to take place permitting the motor base to move in relation to the bracket.

Figure 5 illustrates the apparatus to which the connection of shaft 101 is made and illustrates a commercial type of variable speed motor base and pulley. As the operating shaft 101 is rotated through handwheel 96 and shaft 86 of the speed determiner, the screw shaft 109, of the motor base, is turned a proportionate amount. To this shaft is pinned a bevel gear 110, meshing with another bevel gear 111 which transmits movement to a shaft 112 at right angles to shaft 101. The shaft 112 carries a sprocket 113 on its outer end in driving connection with another sprocket 114 on the variable pitch pulley 115 of the motor 116 through a sprocket chain 117. The variable pitch pulley 115 is not shown in detail since this principle consists simply in changing the depth of a multiplicity of V-shaped pulley grooves in the pulley 115, for the purpose of allowing variation of the pitch. As the pitch diameter of the pulley is altered it naturally becomes necessary to change the position of the motor base 100, since the lengths of the belts 119 are constant.

For this purpose the operating shaft 101 is provided with the slidable coupling 108, consisting of a sleeve 120 having a bore telescopically receiving a shaft 121. The shaft 121 has a keyway engaged by a pin on the sleeve to establish a non-rotatable connection. The shaft section of the motor has a screw-threaded engagement with a lug 122 of a stationary base 123 of the motor base unit. The movable portion of the unit carrying the motor has a lug 124, the shaft being journalled in this lug between a collar 125 and the bevel gear 110.

Thus it may be seen that rotation of the screw portion of the shaft 101 simultaneously alters the pitch of the pulley and changes the position of the motor to keep the belts at the proper tension.

As the motor unit is shifted in changing speed ratios, the balance of the arm 21 is affected. To prevent an overbalance of the cutter head end of the arm, a weight compensating unit 130 is employed. The unit consists of a bell-crank lever 131, pivoted between a pair of lugs, 132, 132, on the arm. The lever 131 is bent angularly at the upper end and has a slot 133 traversed by the cross pin between a pair of lugs 134, 134, on the moving portion of the motor base unit. Thus it is seen that as the motor is shifted forwardly, the weight 135 on the outward end of the lever 131 will move outwardly to compensate for the variation in balance, as shown in Figure 2.

The cutter arm supporting the power unit and cutter head, consists generally of a casting having a top reinforced with longitudinal ribs 136, 136. These include bosses 137, 137, formed integrally therewith for disposal between the trunnion bearings 23, 23. The arm is suitably stiffened by transverse ribs 138, 138.

The bar stock used in the fabrication of the bits of this invention is of the proper composition and hardness to produce bits without further treatment. In some instances of the stock and abrasive disc, the high speed of the cut-off disc has a tendency to heat the bits and to soften the cutting points. To avoid this condition a cooling system is employed.

A coolant tank 140 is located in the hollow base of the machine and has an intake pipe connection 141 to a pump 142, fastened to the tank in an inset portion of the tank, provided for the purpose. The pump is of the centrifugal type and is coupled to a motor 143 mounted on the top and controlled from a switch, separate from the main motor switch (not shown). An outlet pipe 144 leads from the pump to the underside of the work table where a connection is made to a nozzle 145 through a nipple 146. The nozzle is directed to the bar at the cutting portion of the disc and is supported by an angular holder 147, the holder being fastened to the table by the nipple 146. The forward end of the nozzle is tapered to produce a reduced outlet and the top is slotted, as at 148, to dispose the nozzle in the plane of or straddling the cut-off disc with sufficient clearance for operation (see Figure 10).

A projecting lip 150 surrounds the work table to retain the coolant, and a drain opening 85 drains it into a grit settling tank 152. The tank 152 is rectangular in shape; it is slidably mounted on channels 153. A handle 154 facilitates withdrawal for cleaning purposes. Baffle plates 155, 156, are disposed laterally of the tank to divide it into settling compartments 157, 158. The upper edge of the baffle plate 156 is cut angularly to allow a lower liquid level in the intermediate compartment 158. The tank 152 is in the nature of a drawer slidably insertable into the side of the frame.

A third compartment, namely 159, delivers to the drain opening 160 a lip 161 being formed around the opening to maintain a third liquid level. By this arrangement the coolant passes through three settling stages for successively removing the grit and cuttings. The first compartment catches the heavier material, the lighter or finer grades settling as the liquid finds its way to the opening 160 to overflow the lip 161 and drop into the tank. The depending channel or deflector 84 of the wheel guard serves to conduct the coolant, which is thrown off the wheel, to the settling tank 152 through the opening 85.

A certain amount of the coolant will drain down the bit passageway and chute to the bit hopper. Therefore, a drain 163 is provided in conjunction with the hopper to allow this liquid to drain back into the coolant tank. A nipple 164 is screwed to the bottom of the hopper at the lower end to fit loosely into the open end of the drain 163 when the hopper is in normal position. The drain passes through the end wall of the base of the machine at an angle and passes through an opening in the coolant tank provided for the purpose.

The coolant is pumped under considerable pressure. This is necessary for the reason that if there were not enough pressure, the wind current developed by the cut-off wheel in the motion would work against the coolant so as to cause it to be misdirected. The width of the opening which straddles the wheel is defined by certain limitations. If it is too wide, the velocity of the coolant will drop and the coolant will be misdirected. If there is not enough clearance, there will be an insufficient supply of coolant for keeping down the temperature. A clearance of approximately 3/64 of an inch at each side is preferred.

The relationship of the nozzle to the bar stock is important. The nozzle is of a height and is aligned with the work so as to overlap the bar stock at the top and bottom for the purpose of preventing localized heating. The coolant advances directly with the wheel toward the bar stock, that is to say, in alignment with the rotative path of movement with the wheel.

The slot in the lower portion of the nozzle stops inside the fixture and the front end of the fixture is plugged so as to prevent the possibility of by-passing the coolant before it reaches the cutting portion of the disc. The extremity of the nozzle is as close as possible to the work, the nozzle being formed so that it can be adjusted longitudinally in the supporting fitting in order to retain a constant position relative to the work when the fixture is adjusted. By using the nozzle as illustrated in conjunction with the coolant pumped under pressure, a novel method of dissipating the heat has been developed. The peripheral speed of the wheel can approximate 16,000 feet per minute or greater and at the same time the heat is conveyed away fast enough to prevent harmful overheating of the steel. This is of primary importance since the speed of operation is the essence of success in this method. The time of cutting is obviously decreased with the wheel running at relatively high velocity.

Having described my invention, I claim:

1. A machine for cutting bar stock into bits, comprising, a frame, a cut-off wheel driven at high speed, a movable support for said cut-off wheel, a fixture for clamping the bar stock in the path of movement of the cut-off wheel, adjustable stops, means for adjusting said stops, for controlling the range of movement of the support and limiting it to an amount sufficient for severance of the bar stock but eliminating unnecessary movement of the support, a speed regulator for the cut-off wheel and an operating connection between the means for adjusting the adjustable stops and the speed regulation, whereby the revolutions of the cut-off wheel are increased as the wheel diameter becomes less.

2. In a machine for cutting bits from bar stock, a frame, a cutter unit including an arm fulcrumed on the frame, a cut-off wheel mounted on the outer end of the arm, power means for driving the cut-off wheel at high speed, a work holding fixture on the frame for clamping the bar stock on the frame beneath the cut-off wheel, means for raising and lowering the cut-off wheel for passing the cut-off wheel through the work, said work holding fixture including clamping arms, operating means for moving the clamping arms, whereby the work may be clamped as the cut-off wheel engages the same and unclamped after the cut, and an ejector engaging the cut-off bit for directing it from the fixture into a receptacle, said ejector spring urged against the portion of the bar stock being cut off, and effective for pressing the cut-off element into a discharge opening of the frame when the clamping arms are released.

3. A machine for severing elements from bar stock, including, a frame, an arm pivotally mounted on the frame, a cut-off wheel rotatively mounted on one end of the arm, a motor including a variable pitch pulley mounted on the other end of the arm, said cut-off wheel including a driving spindle having a pulley mounted thereon, a driving belt between the respective pulleys, means at the cut-off wheel end of the arm for varying the pitch of the motor pulley and coincidentally shifting the motor for varying the distance between the centers of the pulleys, a balance device associated with the motor and the arm including a weight shiftable as the motor is adjusted for maintaining the condition of balance of the arm constant, the motor and cut-off wheel elements positioned on the arm so as to cause the arm to remain with the cut-off wheel in raised position normally, a work holding fixture securing the bar stock on the frame beneath the cut-off wheel, and a handle on the arm for lowering the cut-off wheel through the bar stock.

4. A machine for severing elements from bar stock, comprising, a frame, an abrasive cut-off wheel, a support for rotatively mounting said abrasive cut-off wheel, said support adjustable for moving the abrasive cut-off wheel toward and from the frame, means for driving the cut-off wheel at high speed, a work fixture including a channel slidably receiving the bar stock obliquely with relation to the path of movement of the cut-off wheel toward and from the frame, said fixture including a clearance slot receiving the cut-off wheel as it is lowered through the bar stock, adjustable stops in the channel, one of which engages the oblique cut-off end of the bar stock, and the other of which engages the side of the bar stock for preventing canting thereof in the channel as the bar stock is fed longitudinally of the channel against the first mentioned stop.

5. A machine for severing elements from bar stock, comprising, a frame, an abrasive cut-off wheel, support means for rotatively supporting said cut-off wheel, said support means adjustably mounted for moving the cut-off wheel toward and from the frame, a work holding fixture for securing the bar stock in the path of movement of the cut-off wheel, spring urged fingers for clamping the bar stock in the fixture, an ejector finger for engaging the cut-off element to deliver it from the machine, and a treadle for operating the clamping fingers and the ejector finger, said ejector finger automatically operable upon release of the clamping fingers for ejecting the cut-off element.

6. A machine for severing elements from bar stock, comprising, a frame, an adjustable support, a power driven cut-off disc mounted in the adjustable support, a bar stock holding fixture, means for moving the adjustable support toward and from the fixture for passing the disc through the bar stock, an ejector finger for discharging the cut-off element from the fixture, a receptacle for receiving the discharged elements, said receptacle tiltable for discharging the cut-off elements, means for delivering a coolant to the region of the cut-off operation, a return duct for said coolant, and a coolant discharge nozzle extending from the receptacle and engageable in a coolant return duct when the receptacle is in normal position.

7. A machine for severing elements from bar stock, comprising, a frame, a cut-off wheel, support means for rotatively supporting said cut-off wheel, said support means adjustably mounted for moving the cut-off wheel toward and from the frame, a work holding fixture for securing the bar stock in the path of movement of the cut-off wheel, spring urged fingers for clamping the bar stock in the fixture, an ejector finger for engaging the cut-off element to deliver it from the machine, and a treadle for operating the clamping fingers and the ejector finger.

8. A machine for severing elements from bar stock, comprising, a frame, an adjustable support, a power driven cut-off disc mounted in the adjustable support, a bar stock holding fixture, means for moving the adjustable support toward and from the fixture for passing the disc through the bar stock, an ejector finger for discharging the cut-off element from the fixture, and a receptacle for receiving the discharged elements, said receptacle tiltable for discharging the cut-off elements.

9. In a machine for severing elements from bar stock including a frame, an adjustable support, a power driven cut-off disc mounted in the adjustable support; a bar stock holding fixture including an ejector finger for discharging the cut-off element from the fixture and means for clamping the work in position during the cut-off operation.

10. In a cut-off machine means as an arm for mounting a high speed rotatable disk for accomplishing the cutting, said disk being of expendible nature and hence subject to reduction of its diameter during use, said arm being movable to and from a work cutting position, and stop means for the said arm comprising a pair of stops for the limiting of motion of said arm at both ends of its stroke, and single means for adjusting the position of the arm with reference to both of said stops simultaneously without changing the relation of said stops to each other.

11. In a cut-off machine means as an arm for mounting a high speed rotatable disk for accomplishing the cutting, said disk being of expendible nature and hence subject to reduction of its diameter during use, said arm being movable to and from a work cutting position, and stop means for the said arm comprising a pair of stops for the limiting of motion of said arm at both ends of its stroke, and means for adjusting the position of the arm with reference to said stops without changing the relation of said stops to each other, said means comprising a screw threaded in the arm, said stops being both mounted on said screw.

12. In a cut-off machine means as an arm for mounting a high speed rotatable disk for accomplishing the cutting, said disk being of expendible nature and hence subject to reduction of its diameter during use, said arm being movable to and from a work cutting position, and stop means for the said arm comprising a pair of stops for the limiting of motion of said arm at both ends of its stroke, and means for adjusting the position of the arm with reference to said stops without changing the relation of said stops to each other, said means comprising a screw threaded in the arm, said stops being both mounted on said screw and the stop for limiting the cutting stroke of the arm being adjustable.

13. In a cut-off machine, a high speed rotating disk movable to and from a work cutting position, and means for supplying a coolant for said work cutting operation comprising a nozzle directed toward the work engaging point of the disk, means for supplying coolant under pressure to said nozzle so directed as to enforce a flow of the coolant toward the work engaging point, a slot in said nozzle supplying clearance for the disk, said nozzle located so that the edge of the disk may lie within the nozzle during its cutting operation.

14. In a cut-off machine, a high speed rotating disk movable to and from a work cutting position, and means for supplying a coolant for said work cutting operation comprising a nozzle directed toward the work engaging point of the disk, means for supplying coolant under pressure to said nozzle so directed as to enforce a flow of the coolant toward the work engaging point, and a slot in said nozzle supplying clearance for the disk, said nozzle located so that the edge of the disk may lie within the nozzle during its cutting operation, said disk arranged to rotate toward the work cutting position from the nozzle, said nozzle being restricted at its orifice as compared to a wider portion behind said orifice.

15. In a cut-off machine, the combination with a work supporting table, of a movable support on which is rotatably supported a cutting disk which is subject to wear and hence reduction in diameter during its cutting life, a stop for the cutting stroke of said support adjustable for varying diameters of cutting disk, a driving means for said disk, and means operated simultaneously with the stop for changing the speed of the disk to increase it as its diameter becomes less, whereby a substantially uniform peripheral speed for the cutting disk is obtained.

16. In a cut-off machine, the combination with a work supporting table, of a movable support on which is rotatably supported a cutting disk which is subject to wear and hence reduction in diameter during its cutting life, a stop for the cutting stroke of said support adjustable for varying diameters of cutting disk, a driving means for said disk, and means operated simultaneously with the stop for changing the speed of the disk to increase it as its diameter becomes less, whereby a substantially uniform peripheral speed for the cutting disk is obtained, and means for separately adjusting the relation of said stop and the support.

17. A hold down and ejector device for material cut from a supply piece in a cut-off machine, comprising a movable member, hold down means normally held in position to engage the work, an additional hold down device also normally held in such position, means for connecting said movable member with the hold down means so as to lift said means from hold down position, and lost motion means whereby the additional hold down device is not lifted until after the first noted hold down devices are lifted, whereby said additional hold down will tip a piece of work which has been cut from the work and thus eject the same.

18. A hold down and ejector device for material cut from a supply piece in a cut-off machine, comprising a movable member, hold down means normally hold in position to engage the work, an additional hold down device also normally held in such position, means for connecting said movable member with the hold down means so as to lift said means from hold down position, and lost motion means whereby the additional hold down device is not lifted until after the first noted hold down devices are lifted, whereby said additional hold down will tip a piece of work which has been cut from the work and thus eject the same, said hold down means consisting of a pair of spring pressed levers, said hold down device consisting of a spring pressed lever, and means on the outer portion of the hold down device lying in the path of one of the hold down levers so as to be operated thereby, there being a space between said means and said lever whereby as initially operated the lever will not act upon said means.

ARMIN O. BRUESTLE.